United States Patent [19]
Dyott

[11] Patent Number: 5,340,371
[45] Date of Patent: Aug. 23, 1994

[54] OPTICAL FIBER SPLICING CHUCK

[75] Inventor: Richard B. Dyott, Oak Lawn, Ill.

[73] Assignee: Andrew Corporation, Orland Park, Ill.

[21] Appl. No.: 40,473

[22] Filed: Mar. 31, 1993

[51] Int. Cl.$^5$ .......................................... C03B 23/207
[52] U.S. Cl. .......................................... 65/501; 65/410; 269/902; 269/254 R; 269/903; 156/158; 279/79; 385/97; 385/98
[58] Field of Search ............ 269/903, 902, 21, 254 R; 279/3, 79; 65/4.21, 4.1, 4.2, 11.1; 385/97, 98; 156/158

[56] References Cited

U.S. PATENT DOCUMENTS

| | | | |
|---|---|---|---|
| 3,920,432 | 11/1975 | Smith | 65/4.21 |
| 3,998,445 | 12/1976 | Goltz | 269/902 |
| 4,562,632 | 1/1986 | Parchet | 269/902 |
| 4,756,518 | 7/1988 | Varin | 269/902 |
| 5,183,489 | 2/1993 | Brehm | 65/4.2 |

FOREIGN PATENT DOCUMENTS 2039378 1/1979 United Kingdom ................. 65/4.21

*Primary Examiner*—W. Gary Jones
*Assistant Examiner*—John Hoffmann
*Attorney, Agent, or Firm*—Arnold, White & Durkee

[57] ABSTRACT

A fiber holding chuck comprising a silica glass rod having a fiber groove or fiber chuck for an optical fiber. The optical fiber lies in the fiber groove, and a clamping mechanism holds the optical fiber in place. The fiber holding chuck positions the optical fiber without damaging the fiber in order to align the fiber with another fiber. The clamping mechanism maintains the position of the aligned fiber. The fiber chuck mounts in a chuck groove of a chuck mounting fixture. The chuck mounting fixture attaches to a fiber positioning mechanism, and the positioning mechanism positions the chuck mounting fixture along with the fiber chuck and the optical fiber to align and splice two optical fibers together while reducing the risk of damage to the optical fiber.

14 Claims, 2 Drawing Sheets

OPTICAL FIBER SPLICING CHUCK

FIELD OF THE INVENTION

The present invention generally relates to the field of fiber optics. More particularly, this invention relates to an apparatus for aligning optical fibers so that they may be joined to each other by splicing techniques.

BACKGROUND OF THE INVENTION

The field of fiber optics is generally concerned with the transmission of light along a transparent fiber structure or core which has a higher refractive index than its surroundings. Typically, an optical fiber consists of a core of transparent material having a refractive index n1 surrounded by a layer of transparent cladding material having a refractive index n2 which is lower than n1. The core and the cladding form a guiding region. Usually, the core and guiding region have a circular or elliptical shape. Fibers with elliptical cores have a minor and major axis such that light travels along one of these axes. Such a fiber is called a polarization-holding fiber. The optical fiber can also include an outer protective layer.

Currently, it is possible to manufacture long, continuous strands of optical fiber which may propagate signals without substantial attenuation over long distances. It is also possible to manufacture the fiber structure as an optical waveguide wherein only preselected modes of light propagate in the fiber. By limiting wave propagation through the fiber to a single mode, the bandwidth of the optical fiber may be exceedingly high to provide a high information-transfer capacity.

In sensing and control systems, a fiber-optic transducer is used that exploits either multi-mode or single-mode light propagation in an optical fiber. While multi-mode sensors use amplitude variations in the optical signals to sense and transmit the desired information, single-mode sensors use phase variations rather than amplitude variations. The single-mode sensors usually involve mechanisms for altering such properties of the fiber as path length or index of refraction to effect the desired phase variations in the optical signal. Thus, in contrast to multi-mode sensors, in single-mode sensors the uniformity and mechanism of light propagation and hence the characteristics of the fiber are especially critical.

Single-mode sensors are sensitive to the state of polarization of the light in the fiber. Thus, for single-mode transducers, it is desirable to use elliptical-core or other kinds of polarization-holding fiber. See, e.g., McMahon et al, "Fiber-Optic Transducers," IEEE Spectrum, December, 1981, pages 24–27. Most of these polarization-holding fibers are capable of preserving the polarization of signals along two different, usually orthogonal, axes, such as the major and minor axes of an elliptical core.

As is known in the literature, e.g., Dyott et al., Preservation of Polarization in Optical-Fiber Waveguides with Elliptical Cores," Electronics Letters, Jun. 21, 1979, Vol. 15, No. 13, pp. 380–82, fibers with elliptical cores and a large index difference between the core and cladding preserve the polarization of fundamental modes aligned with the major and minor axes of the ellipse, i.e., modes having their electrical fields parallel to the major and minor axes of the ellipse. If the core-cladding index difference and the difference between the lengths of the major and minor axes of the ellipse are sufficiently large to avoid coupling of the two fundamental modes, the polarization of both modes is preserved.

Commonly, it is necessary to splice together optical fibers. Optical fibers are spliced together by aligning two similar fiber ends, bringing the two fiber ends into contact and bonding the two ends together. Bonding is accomplished by fusing or melting the two fibers together, mechanically holding the fibers together or adding a bonding agent in the interface between the two abutting surfaces of the fiber ends. Optical fiber splices suffer from two types of attenuation losses. Intrinsic losses arise from differences between the two fibers being joined, such as differences in the refraction index and the size and shape of the fiber core. Extrinsic losses occur from the misalignment of the fiber ends and contamination.

In a typical fusion splicer for optical fibers, the two fibers that are to be spliced to each other are laid in a holding "chuck," which consists, at a minimum, of a metal rod with a precision machined V-groove and a clamping mechanism to hold the fibers in place. The clamping mechanism is often a flat spring with a small weight on top. In that case, the fiber must protrude above the top of the V-groove so that the spring contacts the fiber. The clamping mechanism can also include the application of a vacuum to the bottom of the V-groove.

Active alignment techniques ensure proper alignment of the two fibers by launching light into the fiber and detecting the light at the other end. Polarization-holding fibers such as elliptical core fibers require that the major and minor axes of the core properly align. If the two fibers do not properly align, then an alignor moves one fiber in two orthogonal directions orthogonal to the fiber axis until a maximum amount of light is detected. Once aligned, the gap between the fiber ends is then decreased by moving one fiber in an axial direction. The whole process is repeated until an absolute maximum amount of light appears at the detector. Another alignment method is described in pending patent application Ser. No. 07/935,825. After alignment, the holding chucks keep the fibers aligned by maintaining the position of the optical fibers relative to each other.

These holding chucks are essential for positioning optical fibers in order to align and splice the fibers together. The "chuck" components are usually machined from metal and, while softer than the silica-based fiber, can damage the fiber surface. This damage results from particles (from the machine tools) becoming embedded in the machined chuck components. These particles can scratch the fiber surface and initiate a fracture of the fiber.

SUMMARY OF THE INVENTION

It is an object of the present invention to provide an improved optical fiber holding chuck that reduces the initiation of fractures in an optical fiber caused by particles embedded in machined chuck components.

It is another object of the present invention to provide an improved optical fiber holding chuck that contributes to the repeatability of insertion of the optical fiber in a splicer.

It is still another object of the present invention to provide an improved optical fiber holding chuck where the chuck mounting fixture does not require the precision machining required for a conventional metal chuck.

It is a further object of the present invention to provide an improved optical fiber holding chuck that easily aligns a fiber with a non-circular cross-section.

Other objects and advantages of the present invention will be apparent from the following detailed description and the accompanying drawings.

In accordance with the present invention, the foregoing objectives are realized by utilizing a fiber holding chuck comprising a silica-based glass rod or fiber chuck, such as borosilicate glass or fused silica, having a fiber groove for an optical fiber. An optical fiber lies in the fiber groove, and a clamping mechanism holds the optical fiber in place. In the case of fibers with elliptical cores, the optical fiber is rotated without damaging it in order to align the major and minor axes of the fiber azimuthally with another fiber. The clamping mechanism maintains the position of the aligned fiber. The fiber holding chuck of the present invention mounts to a chuck mounting fixture. The chuck mounting fixture attaches to a fiber positioning mechanism that positions the chuck mounting fixture together with the fiber chuck, the optical fiber and the clamping mechanism to bring together the properly aligned fibers while reducing the risk of damage to the fiber.

In a preferred embodiment of the present invention, the fiber chuck of the present invention is a silica-based glass rod with one sector of the glass rod missing, forming a fiber groove along the length of the glass rod. The desired cross-sectional configuration for the fiber chuck can vary depending on the cross-sectional configuration of the optical fibers that will be held. The glass rod can be drawn with the desired fiber groove in the same manner as optical fibers are drawn with a desired cross-sectional configuration. Thus, the glass rod is preferably made by forming a preform having the desired transverse cross-sectional configuration and drawing the glass rod from the preform, with the drawing rate and temperature being controlled to produce a glass rod with a cross-sectional configuration similar to that of the preform. Such a preform can be made by machining a sector from a silica-based glass rod. A fiber chuck is drawn from the machined preform at a drawing rate and a controlled temperature to produce a uniform fiber chuck with a cross-sectional geometry substantially the same as that of the preform but on a smaller scale. The uniformity of the glass rod contributes to the repeatability of insertion of the fiber into the splicer.

An optical fiber lies in the missing portion or fiber groove of the fiber chuck, and a spring clamp holds the optical fiber in place. The optical fiber can possess one of a variety of non-circular cross-sections, such as D-fibers, quad-fibers and slotted fibers. Additionally, the non-circular cross-section of the optical fiber can have a predetermined geometric relationship to the guiding region of the fiber such that the orientation of the guiding region can be ascertained, and the alignment of these fibers is accomplished automatically by placing the fiber in a fiber chuck with the proper cross-section. For example, the flat side of an optical fiber with a D-shaped cross-section (D-fiber) can be parallel to the major or minor axis of the elliptical core of the D-fiber. Consequently, the alignment of the D-fiber is automatically accomplished by placing the D-fiber in the fiber chuck of the present invention with the flat side up and engaging a spring clamp across the flat side of the fiber.

The optical fiber must protrude above the fiber groove so that the spring clamp can contact the optical fiber. This requires that the diameter of the glass rod for the fiber chuck be properly chosen. Another embodiment utilizes a vacuum applied to the bottom of the fiber chuck as the clamping machanism. In that case, the optical fiber need not protrude above the fiber groove.

In a preferred embodiment, a length of the fiber chuck is glued into a chuck groove of the chuck mounting fixture. The chuck mounting fixture is similar to the existing optical fiber chuck, having a V-groove and a means of attachment to a splicer positioning mechanism. The chuck groove for the chuck mounting fixture, however, holds the glass chuck while the existing optical fiber chuck holds an optical fiber. An existing chuck for a larger sized fiber can be used as the chuck mounting fixture for the present invention. The chuck groove of the chuck mounting fixture does not require precise machining, unlike the V-groove of existing chucks, because the fiber chuck of the present invention acts as a protective barrier for the optical fiber. Additionally, a metal V-groove is not likely to seriously damage the fiber chuck even if not precisely machined because the fiber chuck is not subject to bending stresses. In any case, some surface damage to that portion of the fiber chuck that contacts the chuck mounting fixture is tolerable. Thus, the fiber chuck can be used repeatedly because it is unlikely to be seriously damaged by the splicing operation. A metal V-groove of an existing chuck, however, can seriously damage an optical fiber if not precisely machined because the optic fiber is subject to bending stresses, and a scratch from embedded particles can lead to a fracture in the fiber.

The optical fiber holding chuck of the present invention reduces the risk of fiber fractures caused by particles embedded in machined chuck components because the present invention eliminates these embedded particles. The glass rod forming the chuck of the present invention does not have any embedded particles that could scratch the optical fiber and is much smoother than any practical machined surface. The fiber chuck can be made from the same material as the optical fiber, but, to eliminate any possibility of fiber surface damage, the fiber chuck can be made from a material softer than the optical fiber, such as borosilicate glass. The spring clamp of the preferred embodiment also does not pose a threat to the optical fiber. The spring clamp is easily cleaned, is softer than the optical fiber and makes light contact with the optical fiber.

DETAILED DESCRIPTION OF A PREFERRED EMBODIMENT

Figure 1:
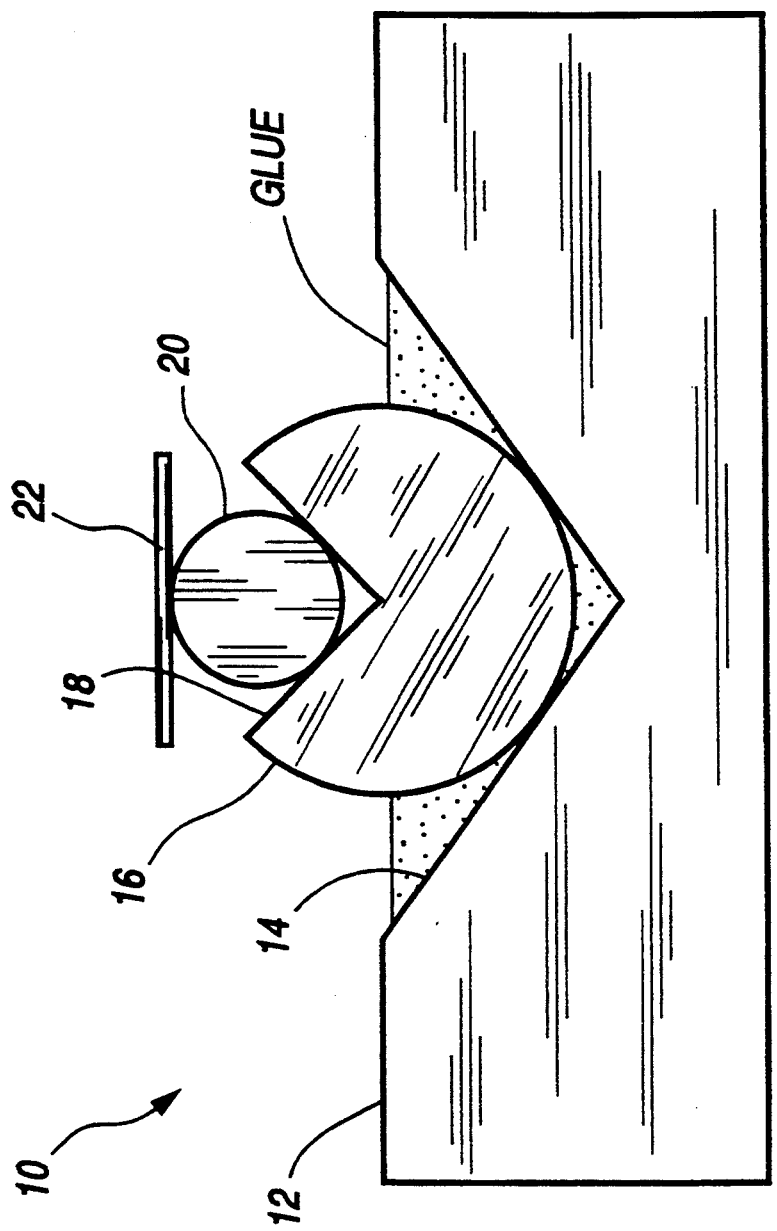
FIG. 1 shows a cross-sectional view of the optical fiber splicing chuck of the present invention.

Referring now to the drawings, and more particularly to FIG. 1, there is illustrated an optical fiber splicing chuck in accordance with the present invention, generally designated by the reference numeral 10. The splicing chuck 10 comprises a chuck mounting fixture 12. The chuck mounting fixture 12 can be an existing splicing chuck for a larger diameter optical fiber. The chuck mounting fixture 12 attaches to a splicer positioning mechanism (not shown) and has a chuck groove 14. A glass chuck 16 mounts into the chuck groove 14 of the chuck mounting fixture 12. In a preferred embodiment of the present invention, the glass chuck 16 is glued into the chuck groove 14 of the mounting fixture 12. The glass chuck 16 is a silica-based glass rod having a missing sector or a fiber groove 18. As previously discussed, the glass rod is machined to remove a sector of the glass, forming a glass chuck preform. The preform is then drawn into a glass chuck 16 of the same cross-sectional shape as the preform but on a smaller scale. An optical fiber 20 rests in the fiber groove 18, and a spring clamp 22 contacts and holds the fiber 20 in place.

The existing metal fiber optic chuck can damage optical fibers because particles embedded in the machined V-groove of existing chucks can scratch the optical fiber. The optical fiber splicing chuck 10 of the present invention, however, is less likely to damage optical fibers. The glass rod is much smoother than any practical machined surface and does not have any embedded particles that might scratch the optical fiber 20. The glass chuck 16 can be made from the same material as the fiber 20, but utilizing borosilicate glass for the glass chuck 16 ensures that the glass chuck 16 is softer than the fiber 20 and, therefore, reduces any possibility of surface damage to the fiber 20. In addition, the spring clamp 22 makes light contact with the fiber 20, is softer than the fiber 20 and can be easily cleaned to remove impurities. These impurities could scratch the optical fiber 20 during alignment and splicing and lead to a fracture of the optical fiber 20.

In order to splice the optical fiber 20 to another optical fiber or optical device (not shown), an operator must ensure that the two fibers are properly aligned. The operator can employ active alignment techniques to determine whether the optical fiber 20 aligns with the other optical fiber. Active alignment techniques include launching a light into one of the fibers, detecting the light at the other end and manuevering one fiber until maximum light is detected. Another active rotational alignment technique is described in pending U.S. patent application Ser. No. 07/935,825. These techniques will ensure that the major and minor axes of two polarization-holding fibers properly align. As discussed above, the use of the glass chuck 16 significantly reduces the chance of particles scratching the fiber 20 during alignment. The spring clamp 22 maintains the position of the optical fiber 20. Once the optical fiber 20 aligns with the other optical fiber, the splicer positioning mechanism of an Ericsson fusion splicer or any other suitable splicer brings the two fibers together for splicing without altering the alignment of the fibers.

Figure 2:
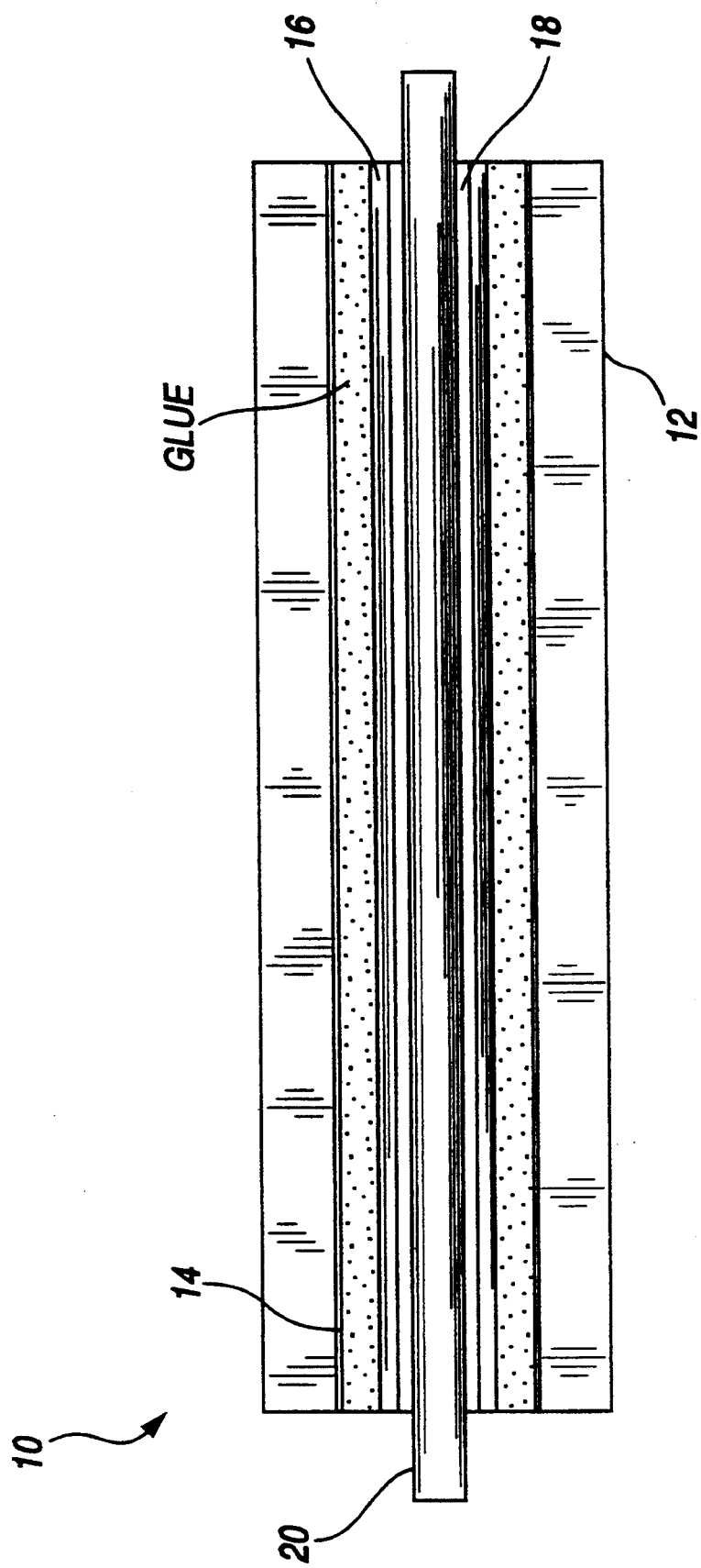
FIG. 2 shows a plan view of the optical fiber splicing chuck of the present invention.

FIG. 2 illustrates a plan view of the optical fiber splicing chuck of the present invention. The glass chuck 16 is a straight, uniform glass rod having the fiber groove 18 along the length of the rod. The uniformity of the glass chuck 16 contributes to the repeatability of insertion of the fiber in the splicer. The optical fiber 20 lies in the fiber groove 18. As discussed above, the fiber 20 rests in the fiber groove 18 during the alignment process. The glass chuck 16 mounts into the chuck groove 14 of the chuck mounting fixture 12. The chuck groove 14 of the mounting fixture 12 does not require precision machining because the glass chuck 16 acts as a protective barrier between the chuck groove 14 and the optical fiber 20. The existing chuck, however, requires precision machining because the existing chuck holds the optical fiber. The optical fiber would be easily damaged by a metal surface that is not precision machined because the optical fiber would be subject to bending stresses during fiber alignment. Thus, the optical fiber splicing chuck of the present invention does not require precision machining for its chuck mounting fixture, but the existing chuck requires precision machining for the V-groove that holds the optical fiber.

The present invention has been described as being used with an optical fiber splicer. The present invention, however, can be used in any situation where the present invention would effectively maintain the position of a fiber without damaging the fiber surface. If the fiber is an optical fiber, the present invention can assist in joining optical fibers to other optical components, such as integrated optic circuits, lasers and lenses. Additionally, the spring clamp utilized in a preferred embodiment of the present invention can take the form of any clamping mechanism to hold the fiber in place, such as applying a vacuum to the bottom of the fiber groove 18. In a preferred embodiment of the present invention, the glass chuck mounts into the chuck groove of the chuck mounting fixture, but the glass chuck does not require a chuck groove for mounting to the chuck mounting fixture. The present invention has also been shown with a circular optical fiber, but the present invention is very effective in aligning noncircular fibers. For example, if a D-fiber is placed in the fiber groove, the alignment of two D-fibers occurs automatically by placing a straight edge spring clamp against the flat top of the D-fiber. Furthermore, a fiber chuck with a different cross-section than the one described above can be selected for an optical fiber.

Thus, the optical fiber splicing chuck of the present invention and many of its attendant advantages will be understood from the foregoing description, and various modifications may be made in the form, construction and arrangement of the components thereof without departing from the spirit and scope of the invention or sacrificing all of their material advantages, the form described above being merely a preferred or exemplary embodiment thereof.

I claim:

1. A fiber holding chuck for use with a fiber positioning mechanism, comprising:
   a chuck mounting fixture having a chuck groove;
   a rod mounted in said chuck groove of said chuck mounting fixture such that a length of said rod in said chuck groove, said rod having a fiber groove along the length of said rod, said rod further having a desired cross-sectional shape;
   a fiber positioned in said fiber groove such that a length of said fiber rests in said fiber groove; and
   a clamping mechanism holding said fiber in said fiber groove when said clamping mechanism is acting on said fiber.

2. A fiber holding chuck for use with a fiber positioning mechanism, comprising:
   a chuck mounting fixture;
   a silica-based glass rod mounted to said chuck mounting fixture such that a length of said rod being mounted to said chuck mounting fixture, said rod having a fiber groove along the length of said rod, said rod further having a desired cross-sectional shape;
   a fiber positioned in said fiber groove such that a length of said fiber rests in said fiber groove; and
   a clamping mechanism holding said fiber in said fiber groove when said clamping mechanism is acting on said fiber.

3. A fiber holding chuck for use with a fiber positioning mechanism, comprising:
   a chuck mounting fixture having a chuck groove;

a rod mounted in said chuck groove of said chuck mounting fixture such that a length of said rod is in said chuck groove, said rod having a fiber groove along the length of said rod, said rod further having a desired cross-sectional shape; and a clamping mechanism for holding a fiber positioned in said fiber groove.

4. The fiber holding chuck of claim 3 wherein said chuck mounting fixture is an existing fiber chuck.

5. The fiber holding chuck of claim 3 wherein said rod is made of glass.

6. The fiber holding chuck of claim 3 wherein said rod is made of borosilicate glass.

7. The fiber holding chuck of claim 3 wherein said fiber is a D-fiber.

8. The fiber holding chuck of claim 3 wherein said rod is mounted in said chuck groove with adhesive.

9. The fiber holding chuck of claim 3 wherein said clamping mechanism is a spring clamp.

10. A fiber holding chuck for use with a fiber positioning mechanism, comprising:

a chuck mounting fixture;

a silica-based glass rod mounted to said chuck mounting fixture such that a length of said rod being mounted to said chuck mounting fixture, said rod having a fiber groove along the length of said rod, said rod further having a desired cross-sectional shape; and a clamping mechanism for holding a fiber positioned in said fiber groove.

11. The fiber holding chuck of claim 10 wherein said rod is made of borosilicate glass.

12. The fiber holding chuck of claim 10 wherein said fiber is a D-fiber.

13. The fiber holding chuck of claim 10 wherein said chuck mounting fixture having a chuck groove, said rod being mounted in said chuck groove.

14. The fiber holding chuck of claim 10 wherein said clamping mechanism is a spring clamp.

* * * * *